Feb. 12, 1952  A. B. DEMBER  2,584,988

DEW POINT MEASURING APPARATUS

Filed March 20, 1947

Inventor
ALEXIS B. DEMBER

By George V. Eltgroth
Agent

Patented Feb. 12, 1952

2,584,988

UNITED STATES PATENT OFFICE 2,584,988

DEW POINT MEASURING APPARATUS

Alexis B. Dember, Towson, Md., assignor to Bendix Aviation Corporation, Baltimore, Md., a corporation of Delaware Application March 20, 1947, Serial No. 735,880

8 Claims. (Cl. 73—17)

This invention relates to humidity responsive measuring apparatus and, more particularly, to apparatus of this class in which provision is made for the registration or indication of dew point temperatures.

The dew point is defined as that temperature at which the air under investigation is saturated with water vapor. It is conventionally determined by chilling a polished metal surface to the temperature at which a cloudy film of condensation first appears. As conventionally performed, this is a discontinuous process giving readings spaced at discrete time intervals. Other setups for the continuous measurement of the dew point have been devised relying upon the photoelectrically controlled circulation of a cooling medium thermally associated with a mirror-like surface. The photoelectric system is energized by light reflected from the polished condensing surface, and acts to interrupt the supply of coolant when the first evidences of condensation impair the reflection properties of the test surface. It is obvious that such a system is expensive because of the requirement for control apparatus, inconvenient because of the necessity for a supply of coolant, and somewhat inaccurate because of the fact that the reflecting surface swings above and below the dew point as a result of the control operation.

Accordingly, it is a primary object of this invention to provide new and novel dew point indicating apparatus.

A further object of the invention is to provide new and novel dew point indicating apparatus delivering continuous indications.

Yet another object of the invention is to provide new and novel dew point indicating apparatus dispensing with the necessity for chilling a test surface.

Still another object of the invention is to provide new and novel dew point responsive apparatus operating without expensive and complicated follow-up control systems.

Other objects and advantages of the invention will in part be described and in part be obvious when the following specification is read in conjunction with the drawing in which.

Figure 1:
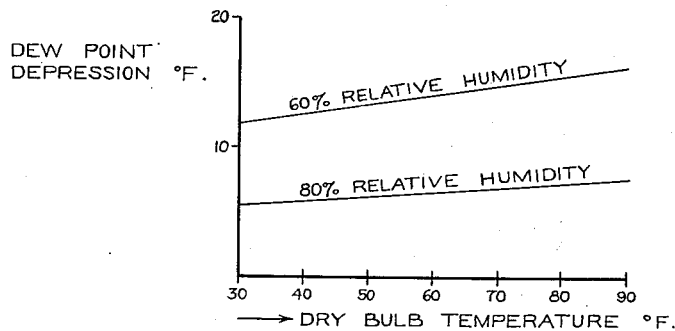
Fig. 1 is a graph illustrating the variation of the dew point depression at various relative humidities for a change in dry bulb temperature.

From the graph of Fig. 1 it is noted that the dew point depression below the dry bulb temperature is a function of the relative humidity, and of the dry bulb temperature, increasing with decrease in relative humidity and with an increase in dry bulb temperature. The data on which these curves are based appear in the Smithsonian Meteorological Tables and the Bulkeley Chart prepared by the American Society of Heating and Ventilating Engineers. From the data of Fig. 1 it will be understood that the dew point may be derived by determining the dry bulb temperature and thereafter subtracting a value determined by the dry bulb temperature and by the relative humidity.

Figure 2:
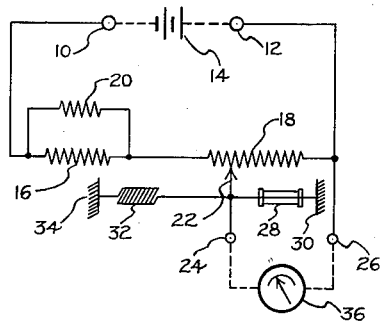
Fig. 2 illustrates schematically a dew point measuring system incorporating the essentials of the invention.

The apparatus of Fig. 2, employing this method, has been found to deliver very accurate measurements of the dew point over a considerable range of ambient dry bulb temperatures. The apparatus itself consists of a pair of terminals 10 and 12 adapted for connection with a source of electric energy 14. A temperature responsive resistor 16 having a very high negative temperature coefficient of resistance is connected at one end with the terminal 10, while its other end is connected with a substantially fixed resistor 18, whose other terminal is electrically linked with the terminal 12. Resistor 18 is of the type having a zero temperature coefficient of resistance and throughout the specification resistor 18 will be noted as a fixed resistor, the term "fixed" connoting the fact that resistor 18 has a zero temperature coefficient of resistance. The negative temperature coefficient resistor 16 may be prepared by firing a mixture of 50–60% ferric oxide with ball clay and titanium dioxide, or may be of the type described by Becker, Green and Pearson in Electrical Engineering, November 1946, published by the American Institute of Electrical Engineers. A fixed resistor 20 having a resistance between two and ten times that of the temperature responsive resistor 16 at the lowest anticipated operating temperature, is connected in shunt with the said temperature responsive resistor 16.

The fixed resistor 18 has a movable tap 22 associated therewith which is connected with a measuring terminal 24, the other measuring terminal 26 being connected with terminal 12. The tap 22 moves over resistor 18 in response to the dimensional changes of a hair element assembly 28 having one end anchored to the frame of the apparatus at 30, while its other end is mechanically coupled to the tap 22. A resilient member, illustrated here as a spiral spring 32, is stretched between the tap 22 and another frame connection at 34 to maintain the hair element 28 under tension.

As is well known, the dimensions of such hair elements are controlled by the relative humidity, the hairs lengthening in the presence of high humidity and becoming shorter in the presence of lower humidities with a logarithmic extension characteristic. Lower humidities, therefore, move the tap 22 to the right in a direction toward the point of connection of the measuring terminal 26. Selection of the proper driving linkage produces a simple power relation between humidity and the active portion of resistance 18. The resistances 16 and 18 are so proportioned that the temperature responsive resistor 16 has a resistance higher than that of the fixed resistor 18 at all temperatures less than the intended maximum temperature of operation. Proper selection of their relative values and that of shunt resistor 20 produces a current through resistor 18 which is an exponential function of dry bulb temperature within the operating range of temperatures. This circuit produces at the voltage measuring terminals 24 and 26 a potential characteristic of the dew point temperature. This potential may be measured by an indicating instrument illustrated schematically at 36, which may be a simple D'Arsonval movement voltmeter, a potentiometer, a vacuum tube voltmeter, or other instrument of this character, preferably drawing negligible power from the tap at the instant measurements are made.

In comprehending the operation of this system, it will be helpful, first, to assume that the tap 22 is at the extreme left-hand end of resistor 18 which may, although not necessarily so, correspond to 100% relative humidity. As the ambient temperature increases, the resistance of temperature responsive resistor 16 decreases permitting an increased flow of current through resistor 18 with a resultant variable voltage developed thereacross. With 100% relative humidity, the dry bulb temperature is equal to the dew point temperature, and the indicating or recording instrument 36 will be deflected over its scale in accordance with the dry bulb temperature and may be calibrated to indicate such values.

If, now, the relative humidity decreases to perhaps 80%, and the ambient temperature is 30° F., the dew point is approximately 24.8° F. The resistor 18 is therefore so proportioned that, as the tap 22 moves thereover in response to the shortening of the hair element, the voltage delivered to the voltage measuring terminals 24 and 26 will be diminished an amount corresponding to 5.2° F., when the current passed by resistor 16 at 30° F., traverses resistor 18.

On the other hand, if one starts with a relative humidity of 100%, and a dry bulb temperature of 80° F., it is necessary that the same travel of the tap 22 over the resistor 18 in response to a decrease of humidity to 80% correspond to 7.2° difference in temperature. This is true in the system shown because with increasing temperature the amount of current flowing through the resistor 18 increases, whereby the same mechanical displacement of the tap 22 thereover produces a larger voltage change at the higher temperatures, thereby introducing the required increase in dew point depression. Apparatus of this type, when constructed, has been found to deliver dew point indications with great accuracy at conditions ranging from a dry bulb temperature of 30° F., and a relative humidity of 30%, to a dry bulb temperature of 104° F., and a relative humidity of 90%. The fixed resistor 20 is connected in shunt with the temperature responsive resistor 16 to give the desired shape to the temperature-current curve, as the resistance of the temperature responsive resistor 16 increases very rapidly at low temperatures, being exponential in form.

The drop or set-back in voltage is proportional to the fall of potential traversed by the tap 22 and this, in turn, is proportional to the product of the current flowing through resistor 18 and the resistance traversed by the tap 22. For the qualitative analysis of the operation of the apparatus, the foregoing viewpoint is most lucid. For the mathematical analysis of the operation of the apparatus, another form of attack is most convenient.

The dew point is a unique function of the ambient vapor pressure, which is itself a function of the ambient dry bulb temperature and the relative humidity.

$$P_0 = A e^{-B/T_0} \quad (1)$$

$B =$ constant; $A =$ constant $$P_d = P_0 f \quad (2)$$

where:

$P_0 =$ saturation vapor pressure at $T_0$
$P_d =$ saturation vapor pressure at $T_d$
$f =$ relative humidity
$T_0 =$ ambient dry bulb temperature, °K.
$T_d =$ dew point temperature, °K.

It is obvious from (2) that $$P_d^n = P_0^n f^n \quad (3)$$

$n =$ any selected exponential power

When the resistor 16 is of the type above-mentioned, the flow of current through the circuit in the presence of constant voltage is given by $$I = \frac{E}{R} = \frac{E}{a' e^{b/T_0}} = E a e^{-b/T_0} \quad (4)$$

$b =$ constant; $a =$ constant

Defining $$n' = \frac{b}{B}$$

we may write for the current:

$$I = E a e^{-n'B/T_0} \quad (5)$$

From (1)

$$e^{-B/T_0} = \frac{P_0}{A} \quad (6)$$

and inserting this in (5), we have $$I = E \left(\frac{a}{A}\right) P_0^{n'} = C E P_0^{n'} \quad (7)$$

By the use of a suitable resistance taper and mechanical linkage between the movable tap 22, it is possible to make the active portion of the resistor 18 vary in accordance with the relation $$R_h = R_0 f^{n''} \quad (8)$$

$R_h$ = resistance of active portion of resistance 18.

The voltage across the active portion of resistor 18 is then, combining (7) and (8), $$E_h = IR_h = CER_0 P_0^{n'} f^{n''} \qquad (9)$$

It is possible to make $n=n'=n''$ by design, whereupon $$E_h = KP_0^n f^n = KP_d^n$$

which is to say that a voltage is delivered which is related in a predetermined manner to the dew point saturation vapor pressure. It is possible, therefore, to calibrate the voltage sensitive indicator in terms of the dew point saturation vapor pressure or, using well known relationships, in terms of the dew point temperature. For most applications, the dew point temperature will have the most practical significance and the apparatus will be so calibrated.

In the particular design, the resistor 16 had a resistance expressed by $$R_t = 0.214 e^{3800/T_0}$$

was shunted by a one megohm resistor 20 and connected in series with a constant resistor 18. The performance of the overall circuit was such that "b" in Equation 4 was 2620. From the vapor pressure values as given in the Smithsonian Meterological Tables, for the temperature interval from 0 to +40° C.:

$$B = 5330$$

$$N = \frac{b}{B} = 0.49$$

The tap displacement over resistor 18 was made a liner function $f^{1/2}$ and the combined apparatus delivered indications of the dew point temperature with excellent accuracy.

Figure 3:
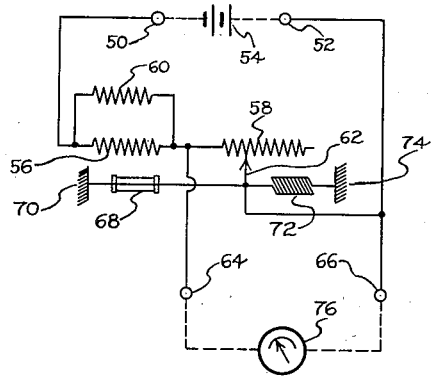
Fig. 3 illustrates schematically an alternative form of a dew point measuring system.

The circuit of Fig. 3 consists also of a pair of terminals 50 and 52 adapted for connection with a source of electric energy 54. A temperature responsive resistor 56, of the type already described, is connected between the terminal 50 and one end of a resistance unit 58 of a rheostat. A fixed resistor 60, having a value between two and ten times the resistance of temperature responsive resistor at the lowest anticipated operating temperature, is connected in shunt with temperature responsive resistor 56. A tap 62 engages the resistance element 58 and is movable thereover under the influence of a hair driving assembly 68, connected with a fixed point 70. The hair element 68 is maintained under tension by a helical spring 72 connected between the tap 62 and a fixed abutment 74. One end of the resistor 58 and the tap 62 are connected respectively by voltage measuring leads with terminals 64 and 66. Any conventional voltage indicating instrument indicated at 76 may be connected across the voltage measuring terminals 64 and 66. Again the total resistance of resistor 58 does not exceed the resistance of temperature responsive resistor 56 at the highest anticipated operating temperature.

In the presence of varying ambient temperatures in the circuit of Fig. 3, the variation of the resistance of the temperature responsive resistor 56 produces similar variations in the flow of current through the active portion of resistor 58 between its end terminal and the movable tap 62. With high humidities, the hair element 68 is extended and the tap 62 lies at the right side of resistor 58 producing a large voltage drop thereacross in response to these changes in current. Diminishing humidity with constant temperature moves the tap 62 to the left, decreasing the voltage drop between terminals 64 and 66 to introduce the necessary dew point depression correction to the dry bulb temperature. These voltage changes may then be interpreted in terms of the dew point temperature by voltage measuring or recording apparatus indicated at 76 forming no part of this invention.

Where voltage measuring apparatus has been indicated in the diagrams, it is apparent that recording or controlling apparatus may be interchangeably connected. The system herein described, the electric power source, and voltage measuring apparatus have been illustrated in dashed lines, as they form no part per se of the invention, but may be supplied by the use of any of the equipment well known in the art.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalents of the claims are therefore intended to be embraced thereby.

What is claimed and desired to be secured by United States Letters Patent is:

1. In humidity responsive apparatus, a pair of terminals adapted for connection with an electric source, a first resistor having a negative temperature coefficient of resistance connected at one end with one of said terminals, a second resistor connected between the other end of said first resistor and the other of said terminals, voltage measuring leads connected with said second resistor at spaced points, one of said leads being in movable contact with the said second resistor and humidity responsive means for actuating the said movable lead whereby the active portion of said second resistor between said voltage measuring leads decreases in the presence of decreasing humidity.

2. In dew point measuring apparatus, a pair of terminals adapted for connection with an electric source, a first resistor having a negative temperature coefficient of resistance connected at one end with one of said terminals, said first resistor being responsive to dry bulb temperature, a second resistor connected between the other end of said first resistor and the other of said terminals, voltage measuring leads connected with said second resistor at spaced points, one of said leads being in movable contact with the said second resistor, and humidity responsive means for actuating the said movable lead whereby the active portion of said second resistor between said voltage measuring leads decreases in the presence of decreasing humidity.

3. The combination defined in claim 2, wherein the resistance of said first resistor is higher than the resistance of said second resistor throughout the normal dry bulb temperature range of said apparatus.

4. The combination defined in claim 3, wherein said first resistor is shunted by a third resistor.

5. The combination defined in claim 4, wherein the said active portion of said second resistor varies as a power function of relative humidity and the current flowing through said second resistor is exponentially related to dry bulb temperature, the said current increasing with increasing dry bulb temperature.

6. The combination defined in claim 5, wherein the current flowing through said second resistor varies as a power function of the water vapor saturation pressure at the ambient dry bulb temperature.

7. The combination defined in claim 6, wherein the said power functions are equal.

8. The combination defined in claim 7, wherein indicating means are connected to said voltage measuring leads to give an output indication of dew point temperature.

ALEXIS B. DEMBER.

REFERENCES CITED

The following references are of record in the file of this patent:

UNITED STATES PATENTS

| Number | Name | Date |
|---|---|---|
| 2,107,017 | Spilhaus | Feb. 1, 1938 |
| 2,250,712 | Johnson | July 29, 1941 |
| 2,349,860 | Hainer | May 30, 1944 |
| 2,412,782 | Palmer | Dec. 12, 1946 |

FOREIGN PATENTS

| Number | Country | Date |
|---|---|---|
| 2,078 | Great Britain | May 12, 1881 |
| 44,274 | France | Oct. 31, 1933 |
| 444,274 | Great Britain | Apr. 25, 1935 |